United States Patent
Kessler et al.

(10) Patent No.: US 11,074,238 B2
(45) Date of Patent: Jul. 27, 2021

(54) REAL-TIME ANONYMIZATION

(71) Applicant: SAP SE, Walldorf (DE)

(72) Inventors: Stephan Kessler, Linkenheim-Hochstetten (DE); Thomas Seufert, Oftersheim (DE); Kai Morich, Hockenheim (DE)

(73) Assignee: SAP SE, Walldorf (DE)

( * ) Notice: Subject to any disclaimer, the term of this patent is extended or adjusted under 35 U.S.C. 154(b) by 700 days.

(21) Appl. No.: 15/979,067

(22) Filed: May 14, 2018

(65) Prior Publication Data

US 2019/0347344 A1 Nov. 14, 2019

(51) Int. Cl.
| | |
|---|---|
| *G06F 16/22* | (2019.01) |
| *G06F 11/34* | (2006.01) |
| *G06F 21/62* | (2013.01) |
| *G06F 16/23* | (2019.01) |
| *G06F 16/24* | (2019.01) |

(52) U.S. Cl.
CPC .......... *G06F 16/2282* (2019.01); *G06F 11/34* (2013.01); *G06F 16/221* (2019.01); *G06F 16/23* (2019.01); *G06F 16/24* (2019.01); *G06F 21/6254* (2013.01)

(58) Field of Classification Search
CPC .... G06F 16/2282; G06F 16/221; G06F 16/23; G06F 16/24; G06F 11/34; G06F 21/6254; H04L 2209/42; H04L 63/0421; H04W 12/02
See application file for complete search history.

(56) References Cited

U.S. PATENT DOCUMENTS

| | | | |
|---|---|---|---|
| 8,127,299 | B2 | 2/2012 | Morich et al. |
| 8,533,732 | B2 | 9/2013 | Morich et al. |
| 8,676,959 | B2 | 3/2014 | Morich et al. |
| 9,031,976 | B2 | 5/2015 | Seufert et al. |
| 9,152,626 | B2 | 10/2015 | Seufert et al. |
| 9,946,810 | B1 | 4/2018 | Trepetin et al. |
| 2012/0259877 | A1* | 10/2012 | Raghunathan ...... G06F 21/6254 707/757 |

(Continued)

OTHER PUBLICATIONS

Non-final office action issued in U.S. Appl. No. 15/979,032 dated Jun. 4, 2020, 23 pages.

*Primary Examiner* — Alicia M Willoughby
(74) *Attorney, Agent, or Firm* — Fish & Richardson P.C.

(57) ABSTRACT

Techniques are described for real time anonymization. In one example, a first a first query associated with a table is received, the table associated with a first anonymization operation satisfying satisfies a privacy requirement. The first anonymization operation is applied at runtime to generate a first anonymized data set against which the first query is executed. At T2 after T1, a subsequent query is received. A determination is made as to whether a change to the table has occurred since T1. If so, a determination is made as to whether the first anonymization operation satisfies the privacy requirement as applied to the current table. If the operation does not satisfy the privacy requirement when applied to the current table, a second anonymization operation satisfying the defined privacy requirement is determined and applied at runtime to generate a second anonymized data set against which the subsequent query can be executed.

20 Claims, 7 Drawing Sheets

(56) References Cited

U.S. PATENT DOCUMENTS

| | | | |
|---|---|---|---|
| 2013/0246215 A1* | 9/2013 | Faith | G06Q 50/01 |
| | | | 705/26.7 |
| 2015/0007249 A1* | 1/2015 | Bezzi | G06F 21/6227 |
| | | | 726/1 |
| 2017/0132431 A1 | 5/2017 | Gonazlez et al. | |
| 2018/0082082 A1* | 3/2018 | Lowenberg | G06Q 20/10 |
| 2018/0293283 A1* | 10/2018 | Litoiu | G06F 16/2465 |
| 2018/0375956 A1 | 12/2018 | Chan et al. | |
| 2019/0156060 A1* | 5/2019 | Maier | G06N 5/022 |
| 2019/0188292 A1* | 6/2019 | Gkoulalas-Divanis | G06N 20/00 |
| 2019/0266352 A1* | 8/2019 | Gkoulalas-Divanis | G06F 21/6254 |
| 2019/0266353 A1* | 8/2019 | Gkoulalas-Divanis | G06F 21/6254 |
| 2019/0347345 A1 | 11/2019 | Kessler et al. | |
| 2020/0082290 A1* | 3/2020 | Pascale | G06F 21/6254 |

* cited by examiner

205A

| SeqCol | Sickness |
|---|---|
| 1 | Cough |
| 2 | Cancer |

Initial Table Metadata:
- Count = 2
- Max = 2

| SeqCol | Sickness |
|---|---|
| 1 | Cough |
| 2 | Cancer |
| 3 | AIDS |

Table after Insert of New Entry "AIDS":
- Count = 3
- Max = 3

| SeqCol | Sickness |
|---|---|
| 1 | Cough |
| 3 | AIDS |

Table after Deletion of Entry "Cancer":
- Count = 2
- Max = 3

| SeqCol | Sickness |
|---|---|
| 1 | Cough |
| 3 | AIDS |
| 4 | Broken Leg |

Table after Insert of New Entry "Broken Leg":
- Count = 3
- Max = 4

FIG. 2D

REAL-TIME ANONYMIZATION

BACKGROUND

The present disclosure relates to a system and computerized method for determining, independent of an existing database operation, how to detect changes to monitored or existing tables, as well as to various operations that can be performed in combination with that determination.

For many database applications, operations require a detection of whether data in a table changes. In many instances, change detection may require a comparison of a complete table from a first time to a complete table at a second time in order to determine whether a particular table has been modified.

Anonymization methods and operations can take a data set containing personal and sensitive data as an input and return a non-personal and/or a non-sensitive data set that allows analytics to be performed without compromising the privacy of individuals and/or entities to which entries and portion of the returned data set may apply. In current solutions, anonymization is performed statically (e.g., once during a specific anonymization preprocessing step or operation).

SUMMARY

Implementations of a first solution of the present disclosure are generally directed to identifying or detecting changes to monitored or existing tables without requiring an analysis of the particular data entries within the table. In one example implementation, a computerized method executed by hardware processors can be performed. The example method can comprise identifying a table associated with a data set, the table containing at least one entry. Each entry in the identified table is associated with a sequence column, where each sequence column value comprises a unique positive integer, and the sequence column value for new entries in the table is automatically incremented by one from a last highest sequence column value. At a first time T1, a total count of a number of entries included in the identified table and a maximum sequence column value from each of the at least one entries are calculated at T1. The calculated total count of the number of entries and the maximum sequence column value at T1 are then stored in metadata associated with the identified table. At a second time T2, where T2 is later in time than T1, a total count of a number of entries included in the identified table and a maximum sequence column value from each of the at least one entries at T2 are calculated, and the calculated total count of the number of entries and the maximum sequence column value at the first time in the metadata associated with the identified table are compared to the calculated total count of the number of entries and the maximum sequence column value at the second time to determine whether the values are the same. If the values are the same, then it is determined that the identified table has not changed and a first operation is performed. If the values are not the same, then it is determined that the identified table has changed and a second operation different than the first operation is performed, and the calculated total count of the number of entries and the maximum sequence column value at T2 are stored in the metadata associated with the identified table.

Implementations can optionally include one or more of the following features. In some instances, the operations at T1 are performed in response to receiving a first query executed against the identified table. In those instances, the operations at T1 can include executing the first query against the identified table and transmitting a first response to the first query. In other instances, the operations at T2 are performed in response to receiving a second query to be executed against the identified table at T2, wherein the second query is identical to the first query. In some of those instances, a response associated with the execution of the first query is cached, and the first operation in response to receiving the second query may comprise providing the cached response associated with the execution of the first query in response to receiving the second query. In other of those instances, the second operation performed in response to the second query can comprise executing the second query on the identified table.

In some instances, when a new entry is inserted to the identified table, the sequence column value associated with the new entry is assigned as a next integer higher than previous highest sequence column value used, and the total count of the number of entries in the identified table is increased by one and the maximum sequence column value for the entries is the sequence column value assigned to the new entry.

In some instances, when an entry is deleted from the identified table, the entry including the sequence column value is deleted from the table, and the total count of the number of entries in the identified table is decreased by one. In some of those instances, when the entry deleted is not the most recently added entry in the identified table, the maximum sequence column value for the entries remains unchanged.

In some instances, when an entry is updated in the identified table, the sequence column value associated with an existing version of the entry is reassigned as a next integer higher than the previous highest sequence column value used, wherein the total number of entries in the identified table remains unchanged and the maximum sequence column value for the entries is increased by one.

In some instances, when an entry is updated in the identified table, an existing version of the updated entry associated with the updated entry is deleted, and a new entry is inserted into the identified table. In those instances, the sequence column value associated with the new entry is assigned as a next integer higher than the previous highest sequence column value used, and the total number of entries in the identified table remains unchanged and the maximum sequence column value for the entries is increased by one.

In some instances, the identified table comprises at least one of a logical table and a table created from a JOIN of at least two existing tables.

In some instances, the sequence column and sequence column-related calculations are managed by internal operations of a database. In other instances, the sequence column and sequence column-related calculations are managed at least in part by an application monitoring or associated with changes to the entries in the identified table.

Implementations of the second solution in the present disclosure are generally directed to applying real-time anonymizations to original data sets for responding to queries from one or more consuming applications. In one example implementation, a computerized method executed by hardware processors can be performed. The example method can comprise receiving, at a first time T1, a first query associated with a monitored table, wherein the monitored table is associated with a first anonymization operation, and wherein the first anonymization operation satisfies a defined privacy requirement. The first anonymization operation can be applied to the monitored table at runtime to generate a first anonymized data set. At that time, the first query can be executed on the first anonymized data set and can return a first result set in response to the executed first query. Later, at a second time T2 that is later than T1, a subsequent query associated with the monitored table can be received. A determination can be made as to whether a change to the monitored table has occurred since T1. In response to detecting a change to the monitored table, wherein the changed monitored table comprises an updated monitored table, a determination is made as to whether the first anonymization operation satisfies the defined privacy requirement when applied to the changed monitored table. In response to determining that the first anonymization operation does not satisfy the defined privacy requirement when applied to the updated monitored table, a second anonymization operation capable of satisfying the defined privacy requirement when applied to the updated monitored table is determined. Once the second anonymization operation is determined, it can be applied to the updated monitored table at runtime to generate a second anonymized data set, and the second anonymization operation can be associated with the updated monitored table. At that time, the subsequent query can be executed on the second anonymized data set and a second result set can be returned in response to the executed subsequent query.

Implementations can optionally include one or more of the following features. In some instances, the first anonymization operation may be stored in metadata associated with the monitored table prior to T1, and, in response to determining the second anonymization operation, the second anonymization operation can replace the first anonymization operation stored in the metadata associated with the monitored table.

In some instances, the second anonymization operation is determined automatically without user input in response to determining that the first anonymization operation does not satisfy the defined privacy requirement.

In some instances, in response to determining that the first anonymization operation satisfies the defined privacy requirement when applied to the updated monitored table, the method comprises applying the first anonymization operation to the updated monitored table at runtime to generate a third anonymized data set, and then executing the subsequent query on the third anonymized data set to return a third result set in response to the executed subsequent query.

In some instances, in response to determining that the first anonymization operation does not satisfy the defined privacy requirement when applied to the updated monitored table, no anonymization operations may be identified as capable of satisfying the defined privacy requirements. In those instances, the method may cause the execution of the subsequent query to be denied.

In some instances, in response to detecting that the monitored table is unchanged, the first anonymization associated with the monitored table can be applied to regenerate the first anonymized data set. Once the first anonymized data set is regenerated, the subsequent query can be executed on that data set to return a fourth result set, which is identical to the first result set.

In some instances, the anonymized data sets are not persisted to memory.

In some instances, the method may further include receiving, at a third time T3 after time T2, a second subsequent query associated with the updated monitored table. At that point, a determination can be made as to whether a change to the updated monitored table has occurred since T2. In response to detecting a change to the updated monitored table—where the changed monitored table comprises a second updated monitored table—a determination can be made as to whether the second anonymization operation satisfies the defined privacy requirement when applied to the second updated monitored table. If it is determined that the second anonymization operation does not satisfy the defined privacy requirement when applied to the second updated monitored table, then a third anonymization operation capable of satisfying the defined privacy requirement when applied to the second updated monitored table can be determined. In response to determining that third anonymization operation, the new anonymization operation can be applied to the updated monitored table at runtime to generate a third anonymized data set. The third anonymization operation can then be associated with the updated monitored table. Further, the second subsequent query can be executed on the third anonymized data set to return a third result set.

In some instances, each entry in the monitored table can be associated with a sequence column, where each sequence column value comprises a unique positive integer, and wherein the sequence column value for new entries in the table is automatically incremented by one from a last highest sequence column value. In those instances, determining whether a change to the monitored table has occurred since T1 can include calculating a total count of a number of entries included in the monitored table and a maximum sequence column value from each of the entries at T2. A previously calculated total count of the number of entries and the maximum sequence column value at T1 associated with the monitored table can be compared to the calculated total count of the number of entries and the maximum sequence column value at T2 to determine whether the values are the same. The monitored table can be determined not to have changed if the compared values are the same. If they differ, then the calculated total count of the number of entries and the maximum sequence column value at T2 can be associated with the updated monitored table.

Similar operations and processes related to both solutions may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 2A-2D represent an example set of changes to an example monitored table, and how those changes are determined by the present solution.

DETAILED DESCRIPTION

Figure 1:
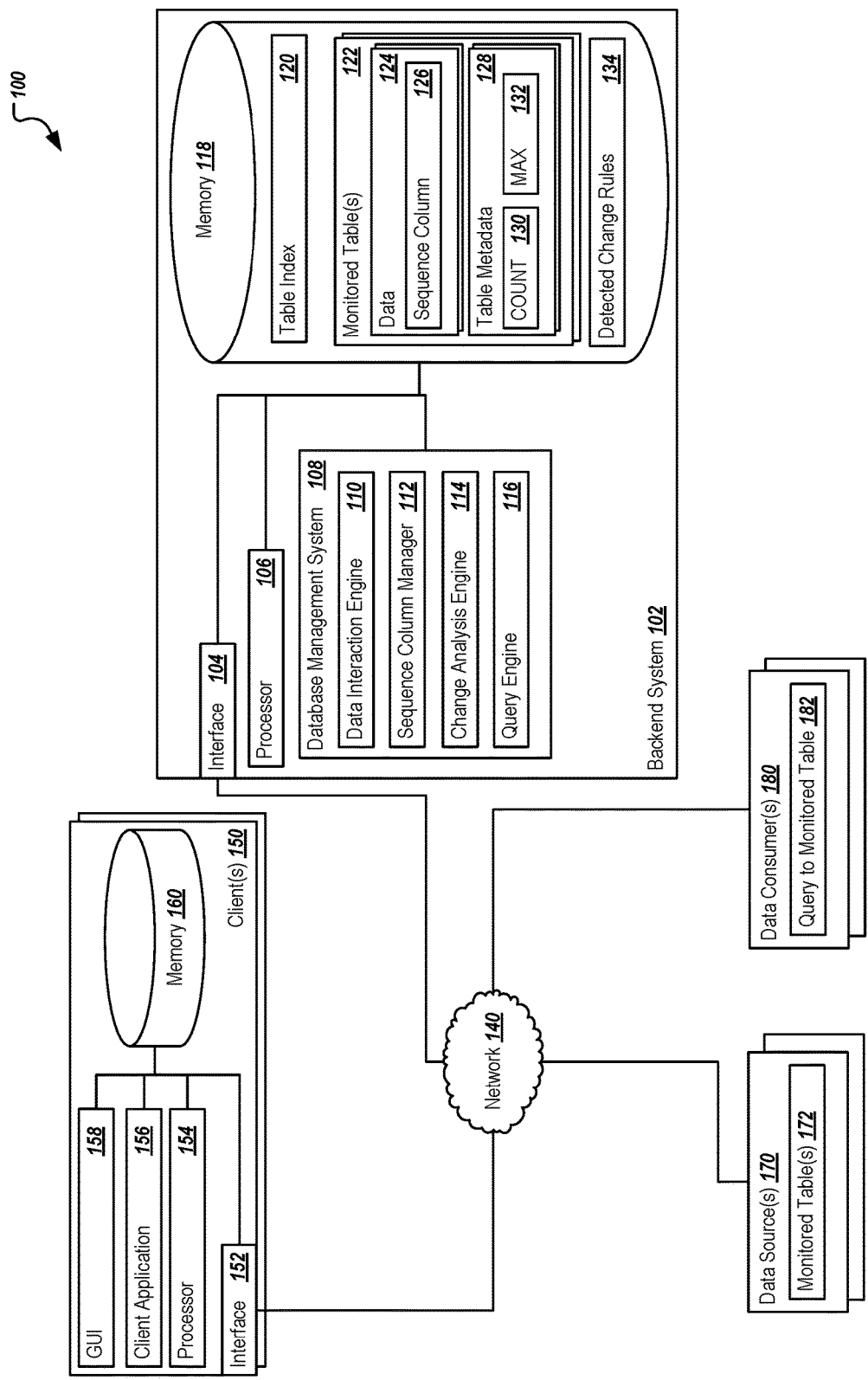
FIG. 1 is a block diagram illustrating an example system for detecting changes to monitored existing tables.

The present disclosure describes systems and methods for identifying or detecting changes to monitored or existing tables without requiring an analysis of the particular data entries within the table. Using the described solution, changes to a data set can be detected during query time without requiring a comparison of the complete previous queried result. For example, the described solution allows applications and/or the database itself to detect changes to the underlying data set without reviewing or determining a list of changes to particular entries within the table and/or with specific actions taken in relation to the table, such as specific insertions, deletions, or updates performed on the data set. Further, the solution does not require any particular database support and can be handled by any particular application with a minimal programming and resource footprint.

For detecting of changed data in a particular table, a sequence column is introduced into existing tables. The sequence column can be a simple addition to the existing table, where the sequence column contains only whole numbers in an increasing manner as new entries in the table are added. The sequence column can be defined by a user or automatically added to the table by the database manager and/or an associated application. The particular values in the sequence column can follow several rules:

Each row or entry is associated with a unique value in the sequence column.

No sequence column values are reused, even where a particular entry has been deleted, the associated column value will not be reassigned.

Values are greater than 0 and can be increased, in most instances, by one as new entries are added. In some instances, negative but sequential numbers would could also be used, as well as numbers incremented by any suitable but constant or predictable value.

Based on the added column, a determination as to whether data has changed can be performed by storing two values from an analysis of the existing table. That is, a number of total entries or rows in the table ("COUNT") can be determined, as well as the maximum value of the highest sequence column value ("MAX"). No further information from the existing table is needed in order to identify any changed data between different times. In some instances, the sequence column may be a logical addition to an existing table, such as where another existing primary key is used, where the primary key can be associated with a new sequence table where different sequence column values are uniquely associated with particular rows or table entries.

The COUNT and MAX may be calculated at various intervals or in response to particular events. In some instances, the COUNT and MAX may be calculated prior to queries being executed against or on the data included within the table, as well as after a query is executed. In some instances, a first query executed against the table including the sequence column can be used to generate a first response as well as the calculated values of the initial COUNT and MAX of the table. Those values can then be associated with the table, and can be stored in a file, metadata, or an associated location in connection with the table for which the values are calculated. In some instances, when a second query is received at a later time, a similar calculation of the current COUNT and MAX can be performed prior to executing the received second query. The current COUNT and MAX can then be compared to a prior COUNT and MAX to determine whether the table has been updated. The information obtainable by the comparison includes:

If the new COUNT and MAX are the same, then the data in the table has not changed.

If the new COUNT is larger than the stored COUNT, then new data has arrived.

If the new MAX is larger than the stored MAX and the new COUNT is identical to or less than the stored COUNT, new data has arrived and at least some data has been deleted or otherwise removed from the table.

The described solution can also work for combinations of multiple sequence columns. That is, if there are two different original tables, each with a sequence column, then changes to any combination of the tables (e.g., a join, etc.) can be detected by investigating both sequence columns following the same or similar strategy.

In some instances, the described solution can also be used to perform additional determinations. For example, an order in which particular data was added to a table can be determined. Data entries and rows with a relatively higher sequence column value than the stored highest value (or prior MAX) can be immediately recognized as new entries, even without specific timestamps or additional information. Additionally, deleted entries can be detected by identifying particular sequence column values not in use (e.g., the current highest value is 5, but no value of 2 is present). Cached result sets can be consulted to determine which particular values have been deleted or otherwise removed, where necessary.

Turning to the illustrated implementation, FIG. 1 is a block diagram illustrating an example system 100 for identifying or detecting changes to monitored or existing tables. As illustrated in FIG. 1, system 100 is associated with a system for managing one or more monitored tables 122 based on changes to particular entries using defined sequence columns 126. The illustrated system 100 can incorporate a plurality of systems to perform and use the detection, including a backend system 102, one or more clients 150, one or more remote data sources 170, and one or more data consumers 180, and can allow the illustrated components to share and communicate information across devices and systems (e.g., via network 140). In some instances, at least some or all of the components may be cloud-based components or solutions, while in others, non-cloud-based systems may be used. In some instances, non-cloud-based systems, such as on-premise systems, may use or adapt the processes described herein. Combinations thereof may also be used, including by providing one or more monitored tables 172 in a remote data source 170, in combination with or instead of monitored tables 122 located in backend system 102. Although components are shown individually, in some implementations, functionality of two or more components, systems, or servers may be provided by a single component, system, or server.

As used in the present disclosure, the term "computer" is intended to encompass any suitable processing device. For example, backend system 102 and client 150 may be any computer or processing device such as, for example, a blade server, general-purpose personal computer (PC), Mac®, workstation, UNIX-based workstation, or any other suitable device. Moreover, although FIG. 1 illustrates a single backend system 102, the system 100 can be implemented using a single system or more than those illustrated, as well as computers other than servers, including a server pool. In other words, the present disclosure contemplates computers other than general purpose computers, as well as computers without conventional operating systems. Similarly, the client 150 may be any system which can request data and/or interact with the backend system 102. The client 150, in some instances, may be a desktop system, a client terminal, or any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™, Android™, Windows Phone OS, or iOS™, among others.

In general, the backend system 102 may be associated with the execution of one or more backend or business applications, including a database management system 108 (DBMS 108) and its associated functionality. In some instances, the backend system 102 may be a dedicated database server, where the backend system's 102 primary functionality relates to actions associated with the management of one or more databases, including the one or more monitored tables 122, providing management of the stored data and access to said data via one or more operations, including various inserts, updates, deletes, and queries to the data 124 within the monitored tables 122. In some instances, the backend system 102 may be associated with an end-to-end business solution system, enterprise resource planning (ERP) systems, customer resource management (CRM) systems, business intelligence systems, cloud platform systems, supplier management (SM) systems, or any other suitable system, including non-business-related systems. In general, the backend system 102 executes at least a database management system 108, which can be interacted with by one or more client applications 156 at various clients, can include data or provide access to data from one or more remote data sources 170, and provide, via the DBMS 108, access to the one or more monitored tables 122 to one or more data consumers 180.

The illustrated DBMS 108 is used to monitor and manage the monitored tables 122 and the data 124 included therein. To support the change detection solution described herein, at least some of the monitored tables 122 can include a sequence column 126 used to provide the information needed to detect changes. As described previously, the sequence column 126 can be used as an incremental counter to uniquely associate each new entry in the table 122 as a newly added entry, and to use the counter to identify, in part, whether any data has been added to a particular monitored table 122 since a prior analysis of the table 122. The sequence column 126 can be of a type integer, big integer, number, or other particular type, and can be limited to positive whole numbers. No sequence column value may be reused even where a particular entry or row is deleted. Each new entry or row is provided with a new sequence column value that is one greater than the prior highest value. At different intervals or in response to particular events, a current count of the entries/rows in the monitored table 122 can be counted, along with a maximum value in the sequence number column 126. Those calculated values can be saved, and stored in a table-related set of metadata 128, with the current count of entries/rows being stored as COUNT 130 and the maximum sequence number value stored at MAX 132. In response to later events, triggers, or attempts at accessing the data, a current calculated count and maximum value can be compared to the stored COUNT 130 and MAX 132 to determine if changes are present. In response to determining a change has occurred, the newly calculated count and maximum value can be stored as the updated COUNT 130 and MAX 132 for later use. If no change has occurred (i.e., the stored COUNT 130 and MAX 132 match the current calculation), then the stored COUNT 130 and MAX 132 can remain the same.

A set of detected change rules 134 can be executed or otherwise consulted to determine the actions to be taken in response to the determination one way or the other. In some instances, such as where a repeated query is provided and the table 122 is determined not to have changed, a cached response to the same query submitted at a prior time may be provided in response to the repeated query. In response to a detected change, the repeated query can be re-executed to obtain an updated data set based on the potential changes to the underlying monitored table 122. In some instances, rules may also be provided or managed by the DBMS 108 or other external applications that monitor, at various intervals, whether particular monitored tables 122 have been changed. In those instances, a new calculation of the count and maximum value can be generated, and a comparison performed to the stored COUNT 130 and MAX 132. If the values remain the same, no further action may be taken, or a notification or other message may be presented to a system or user that no changes have occurred. If, however, the values differ, one or more additional operations may be triggered. In some instances, a presentation of data at a user interface associated with a particular application (e.g., client application 156) can be refreshed to present a potentially new set of results (e.g., by re-executing a query associated with the application). In other instances, additional operations may be taken or initiated, including those related to various business and/or analytical operations. One or more monitoring agents (not shown) may be deployed to monitor particular tables 122 and frequently compare or calculate the current count and maximum value for comparisons to the stored metadata 128.

In some instances, one or more of the monitored tables 122 may be associated with combined sets of data, including joins or unions of various other tables. Those particular tables and their various combinations may be stored or identified in a table index 120, which can allow the various monitored tables 122 to be accessed and understood by outside systems and components.

Returning to the DBMS 108, the system is illustrated as including four components: a data interaction engine 110, a sequence column manager 112, a change analysis engine 114, and a query engine 116. Some or all of the components may be combined into a single component or the DBMS's inherent functionality, while portions of the solution may also be separated into different and/or external components and various applications and/or agents or other software. The data interaction engine 110 can be used to allow various systems, persons, and applications, among other, updated data 124 in particular monitored tables 122. For example, SQL-based commands may be received at the DBMS 108 and used to modify the underlying data 124. In some instances, data may be added via INSERT operations, deleted via DELETE operations, and updated or modified via UPDATE operations, among others. The data interaction engine 110 can provide additional operations for modifying data 124 in particular tables 122, where appropriate.

The sequence column manager 112 can be used to ensure that the sequence column 126 is updated in an appropriate manner in response to changes to particular tables 122 and data 124. In some instances, the sequence column manager 112 may be inherent to or enforced by the particular DBMS 108 (e.g., SAP's S/4 HANA system), or it can be associated with a dedicated application or agent. The sequence column manager 112 can insure that new entries or rows in a particular table are associated with a unique and incremented sequence column value, and that no previously deleted sequence column values are used. In some instances, when a particular entry is associated with an UPDATE operation, the sequence column manager 112 may be used to modify the sequence column value to an incremented value to make clear that the updated entry has been changed. In other instances, the sequence column manager 112 may enforce a rule in response to updates, where the original entry is deleted along with the prior sequence column value, and a new updated entry is added in the deleted entries place, where the new updated entry is associated with a new and incremented sequence column value. Both implementations can assist in ensuring that new or updated data is reflected in the metadata comparison.

The change analysis engine 114 is used to calculate a current number of entries in a particular monitored table 122 and the maximum sequence column value, compare those values to the stored COUNT 130 and MAX 132, and determine whether a change has occurred. The change analysis engine 114 may also be used to calculate an initial COUNT 130 and MAX 132 for a particular monitored table 122 to serve as a baseline or original value. The change analysis engine 114 can be triggered by any suitable system, including agents determining whether changes to the table 122 have occurred based on a preset schedule or in response to a particular event or action (e.g., when results are presented in a particular UI or application, the UI or application may define rules or timings for when potential refreshes are to be considered and the results recalculated), as well as the query engine 116, where the query engine 116 receives a repeated query and, before executing the repeated query, initiates a change detection algorithm to determine how to proceed with the repeated query. The query engine 116 can be used to interpret queries received from one or more client applications 156 and/or data consumers 180, where appropriate, and may be a part of the inherent functionality of the DBMS 108.

As illustrated, the backend system 102 includes interface 104, processor 106, the DBMS 108, and memory 118. The interface 104 is used by the backend system 102 for communicating with other systems in a distributed environment—including within the environment 100—connected to the network 140, e.g., one or more clients 150, data sources 170, and data consumers 180, among others, as well as other systems communicably coupled to the illustrated backend system 102 and/or network 140. Generally, the interface 104 comprises logic encoded in software and/or hardware in a suitable combination and operable to communicate with the network 140 and other components. More specifically, the interface 104 may comprise software supporting one or more communication protocols associated with communications such that the network 140 and/or interface's hardware is operable to communicate physical signals within and outside of the illustrated environment 100. Still further, the interface 104 may allow the backend system 102 to communicate with one or more clients 150 and/or data consumers 180 to receive and respond to particular queries and information requests, as well as to receive updates or interactions with the monitored tables 122 via client application 156 and/or from one or more data sources 170, as described in the present disclosure.

Network 140 facilitates wireless or wireline communications between the components of the environment 100 (e.g., between the backend system 102 and a particular client 150), as well as with any other local or remote computer, such as additional devices, clients (e.g., client 150), servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the illustrated components (e.g., the backend system 102, data sources 170, and data consumers 180, among others) may be included within network 140 as one or more cloud-based services or operations. The network 140 may be all or a portion of an enterprise or secured network, while in another instance, at least a portion of the network 140 may represent a connection to the Internet. In some instances, a portion of the network 140 may be a virtual private network (VPN). Further, all or a portion of the network 140 can comprise either a wireline or wireless link. Example wireless links may include 802.11a/b/g/n/ac, 802.20, WiMax, LTE, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

The backend system 102 also includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the backend system 102, in particular those related to the DBMS 108. Specifically, the processor(s) 106 executes the algorithms and operations described in the illustrated figures, as well as the various software modules and functionality, including the functionality for sending communications to and receiving transmissions from clients 150 and other illustrated components, as well as to other devices and systems. Each processor 106 may have a single or multiple core, with each core available to host and execute an individual processing thread. In particular, processor 106 can be used to execute the DBMS 108 described previously and its functionality. In some instances, one or more of the components of the DBMS 108 may be executed remotely by one or more remote processors 106, as well.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

Memory 118 of the backend system 102 may represent a single memory or multiple memories. The memory 118 may include any memory or database module and may take the form of volatile or non-volatile memory including, without limitation, magnetic media, optical media, random access memory (RAM), read-only memory (ROM), removable media, or any other suitable local or remote memory component. The memory 118 may store various objects or data (e.g., the table index 120, one or more monitored tables 122 and any associated data 124 and table metadata 128, as well one or more detected change rules 134, as well as others, etc.), including financial data, user information, administrative settings, password information, caches, applications, backup data, repositories storing business and/or dynamic information, and any other appropriate information associated with the backend system 102 including any parameters, variables, algorithms, instructions, rules, constraints, or references thereto. Additionally, the memory 118 may store any other appropriate data, such as VPN applications, firmware logs and policies, firewall policies, a security or access log, print or other reporting files, as well as others. While illustrated within the backend system 102, some or all of memory 118 may be located remote from the backend system 102 in some instances, including as a cloud application or repository, or as a separate cloud application or repository when the backend system 102 itself is a cloud-based system.

As illustrated and described, one or more clients 150 may be present in the example system 100. Each client 150 may be associated with requests transmitted to the backend system 102 related to the client application 156 executing on or at the client 150, including those related to modifications to the underlying data 124, as well as to requests to view or visualize particular data 124 and queries submitted to access at least a portion of the data 124. Different clients 150 may interact with different monitored tables 122 via the DBMS 108 and the query engine 116, where the query engine 116 and the change analysis engine 114 are used to determine how and what to provide in response to the received query. Additionally, particular client applications 156 may be used to interact with the monitored tables 122 via data interaction engine 110, allowing clients 150 to modify and/or update particular data 124 therein. When that occurs, the sequence column manager 112 can be used to ensure that the values in the sequence column 126 of the particular table 122 are available to ensure that any changes can be identified during further change detection analyses.

As illustrated, each client 150 may include an interface 152 for communication (similar to or different from interface 104), at least one processor 154 (similar to or different from processor 106), the client application 156, memory 160 (similar to or different from memory 118), and a graphical user interface (GUI) 158.

The illustrated client 150 is intended to encompass any computing device such as a desktop computer, laptop/ notebook computer, mobile device, smartphone, personal data assistant (PDA), tablet computing device, one or more processors within these devices, or any other suitable processing device. In general, the client 150 and its components may be adapted to execute any operating system, including Linux, UNIX, Windows, Mac OS®, Java™, Android™, or iOS. In some instances, the client 150 may comprise a computer that includes an input device, such as a keypad, touch screen, or other device(s) that can interact with the client application 156, and an output device that conveys information associated with the operation of the applications and their application windows to the user of the client 150. Such information may include digital data, visual information, or a GUI 158, as shown with respect to the client 150. Specifically, the client 150 may be any computing device operable to communicate queries or communications to the backend system 102, other clients 150, and/or other components via network 140, as well as with the network 140 itself, using a wireline or wireless connection. In general, client 150 comprises an electronic computer device operable to receive, transmit, process, and store any appropriate data associated with the environment 100 of FIG. 1.

Client application 156 may be any suitable application, program, mobile app, or other component. As illustrated, the client application 156 interacts with the backend system 102 to perform queries and other database and/or table-related operations via DBMS 108 via network 140. In some instances, the client application 156 may be a browser, where the functionality of the client application 156 may be realized using a web application or website the user can interact with via the client application 156. In other instances, the client application 156 may be a remote agent, component, or client-side version of the backend system 102, or another application, which can interact with the monitored tables 122 via the DBMS 108. In some instances, the client application 156 may interact directly with the backend system 102.

In some instances, the client application 156 may be programmed to initiate change detection algorithms on its own, even without submitting a new query to the backend system 102. In some instances, the client application 156 may be able to communicate with the change analysis engine 114, such as by calling the engine 114 via a particular application programming interface (API) or other method, and receiving an indication of whether changes in a particular table have occurred. If changes have occurred, the client application 156 may be able to trigger an updated query to receive a refreshed set of data previously obtained by a prior query or other data request. In other instances, the client application 156 may submit queries for periodic or event-based updates (including manual update requests) to the DBMS 108, which can in turn trigger a change analysis determination at the DBMS 108 prior to the query engine 116 executing the requested query.

GUI 158 of the client 150 interfaces with at least a portion of the environment 100 for any suitable purpose, including generating a visual representation of the client application 156 and/or the content associated with the client application 156 and, in some cases, results or portions of the monitored tables 122. In particular, the GUI 158 may be used to present screens or UIs associated with the client application 156. In some instances, those screens or UIs may include buttons or other interactive elements allowing users to initiate a request for a refresh, or to perform actions within the application 156 which may result in a query to the backend system 102. GUI 158 may also be used to view and interact with various Web pages, applications, and Web services located local or external to the client 150. Generally, the GUI 158 provides the user with an efficient and user-friendly presentation of data provided by or communicated within the system. The GUI 158 may comprise a plurality of customizable frames or views having interactive fields, pull-down lists, and buttons operated by the user. For example, the GUI 158 may provide interactive elements that allow a user to view or interact with information related to the operations of processes associated with the backend system 102, including the presentation of and interaction with particular data 124 included in the one or more monitored tables 122. In general, the GUI 158 is often configurable, supports a combination of tables and graphs (bar, line, pie, status dials, etc.), and is able to build real-time portals, application windows, and presentations. Therefore, the GUI 158 contemplates any suitable graphical user interface, such as a combination of a generic web browser, a web-enable application, intelligent engine, and command line interface (CLI) that processes information in the platform and efficiently presents the results to the user visually.

FIG. 1 further includes one or more data sources 170, which may be one or more external and/or cloud-based data sources 170 storing one or more additional monitored tables 172. The monitored tables 172 may be standalone tables, or such tables may be incorporated with or a part of a join to one or more of the monitored tables 122 in backend system 102. In some instances, the data sources 170 can feed updated information to the monitored tables 122 via the DBMS 108 and its data interaction engine 110, while in other instances the data sources 170 can update the monitored tables 122 in other manners. In any event, data 124 added to the monitored tables 122 can be managed by the sequence column manager 112 to ensure that any modifications can be detected through the described mechanisms.

Similarly, data consumers 180 may be one or more alternative applications, operations, or users interested in data from one or more of the monitored tables 122. In some instances, the data consumers 180 may be interested in and/or associated with particular information stored in one or more monitored tables 122. In some instances, data consumers 180 may be associated with one or more queries to particular monitored tables 182, where those queries are repeated and/or triggered in response to detected changes. For repeated queries 182, the query engine 116 may provide cached data sets in response until a change is detected. In other instances, the data consumer 180 may be associated with an agent or other monitoring application, which can determine when updates to the monitored tables 122 are made. In response to a notification or determination of the change, the query 182 can be triggered to access the updated data set. The data consumer 180 may be any suitable system or component, including a search engine, a web page, a sales system, or any other suitable consumer of data.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

FIGS. 2A-2D represent an example set of changes to an example monitored table, and how those changes are determined by the present solution. As illustrated in FIG. 2A, an initial table 205A includes two sicknesses, a first row for "Cough" and a second row for "Cancer." In response to an initial trigger, such as an initial query to the table 205A, a first count and max can be calculated and stored as an initial set of table metadata. Here, the count and the maximum sequence column value are calculated as 2.

In FIG. 2B, a new entry or row is inserted into the table 205B in response to an INSERT operation. In addition to adding the sickness of "AIDS", a new sequence column value of 3 is added to the "AIDS" entry. If a new change detection algorithm is executed in response to a new query or another trigger, new calculations would result in a count and max of 3.

In FIG. 2C, the entry or row associated with "Cancer" is deleted from the table 205C. In response to a detected change calculation, the new count would be 2, while the maximum value is 3. Therefore, a comparison to the initial metadata would make clear that one entry was added previously (based on the max value increased by one) and that at least one entry has been deleted (based on the difference between the max and the count). In some instances, additional operations could be performed to identify a particular entry or row that has been deleted by accessing a prior version of the table data and determining which entries correspond to any sequence column values that are missing.

In FIG. 2D, another new entry or row is inserted into the table 205D in response to another INSERT operation. The entry "Broken Leg" is added to the table 205D, along with a corresponding new sequence column value of 4. If a change detection algorithm is triggered, then the new count calculated would be 3, while the max value would be 4.

In some instances, multiple modifications to the underlying monitored table may be made before a new change detection algorithm is initiated. For example, the initial table metadata may be stored and checked after 30 minutes of activity based on a predefined query interval. After 30 minutes, the current state of the table may that illustrated in table 205D. In those instances, the only recalculation and comparison would be made between the state of the table in FIG. 2D and the stored metadata identified in relation to FIG. 2A. The comparison would indicate that both the current count and the max are different that that previously calculated, indicating that a change has occurred in the monitored table. As such, a corresponding action or re-execution of a particular query can be triggered based on the detected change such that an updated set of data is available as needed.

Figure 3:
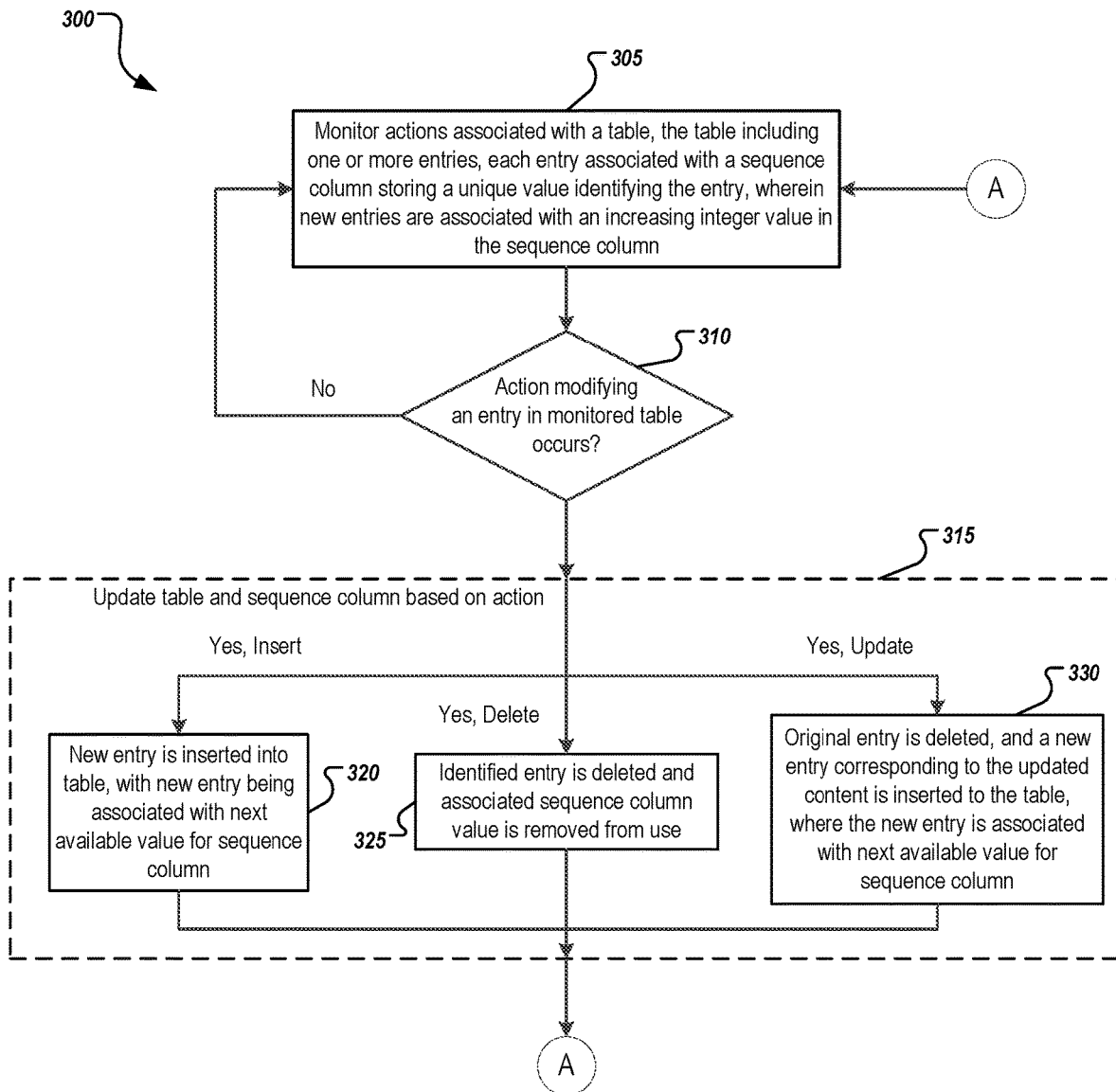
FIG. 3 represents an example flow for updating particular monitored tables in response to modifications to the table data included therein.

FIG. 3 represents an example flow 300 for updating particular monitored tables in response to modifications to the table data included therein. For clarity of presentation, the description that follows generally describes method 300 in the context of the system 100 illustrated in FIG. 1. However, it will be understood that method 300 may be performed, for example, by any other suitable system, environment, software, and hardware, or a combination of systems, environments, software, and hardware as appropriate. In some instances, method 300 may be performed internally by an existing database system and its functionality, while in other instances, one or more new or additional internal or external components may work with the database system to perform the described operations. For example, the sequence column can be maintained by existing database measures (e.g., triggers) or by external measures and/or operations.

At 305, actions associated with a particular table or set of tables are monitored. The monitored table can include one or more entries or rows, wherein each entry is associated with a sequence column that stores a unique integer value that identifies the particular entry. Each sequence column value is only used a single time, without reuse, even where a particular entry is later deleted and the sequence column value is not used any more. When a new entry is added, or when an entry is updated, a next sequence column value is associated with the added or updated entry. The next sequence column value is determined based on a highest value used for the sequence column and incremented by one. In some instances, the monitoring of particular table can be performed by a database management system internal or integral to a database storing the monitored table, while in other instances, the monitoring may be performed by an external application or agent.

At 310, a determination is made as to whether an action modifying a particular entry in the monitored tables occurs. Such actions may include any change to the data in the monitored table, including an insertion of a new entry or row, a deletion of a particular entry or row, or an update to an existing entry or row, among others. Such actions may be associated with a SQL INSERT (or INSERT INTO) statement, a DELETE statement, or an UPDATE statement, among others. If no action is determined to occur, method 300 returns to 305 and the table is monitored. If an action is determined to have occurred, method 300 continues to 315.

At 315, the monitored table is updated and the corresponding sequence column associated with the updated entry is updated as well. At least three different operations may occur, depending on which type of action is detected. In response to a new entry being inserted, the update operations can be described at 320. In those instances, a new entry is inserted into the monitored table, where the new entry is then associated with a next available value for its associated sequence column. For example, if the last new sequence column value added was "8", then the new entry would be associated with the incremented sequence column value of "9". If the action detected is a deletion action, then at 325 the identified entry associated with the delete action is deleted. The associated sequence column value is then removed from use, and will not be used again. Where the action that occurred is the update of an existing entry in the monitored table, then at 330 corresponding operations are taken. In one instance, as illustrated, the existing entry associated with the updated value can be deleted and a new entry corresponding to the update can be inserted into the table. In those instances, the next incremented sequence column value can be associated with the newly added entry. In another implementation, the update can be used to modify the values of the other values associated with the updated entry, and the sequence column value can be modified to be the next incremented sequence column value. In either instance, the result would be that the content of the entry is updated and that an updated sequence column value used to indicate a change has occurred in the table is associated with the updated entry.

Once the update of the table and associated sequence column value is updated, method 300 can return to 305, where additional actions are monitored. The monitoring and updating of the table based on these actions can be performed by a particular component (e.g., the sequence column manager 112 and/or the data interaction engine 110) internal or integral to a DBMS associated with the monitored table. In other instances, at least some of the actions may be performed by a separate and/or remote component and/or agent.

Figure 4:
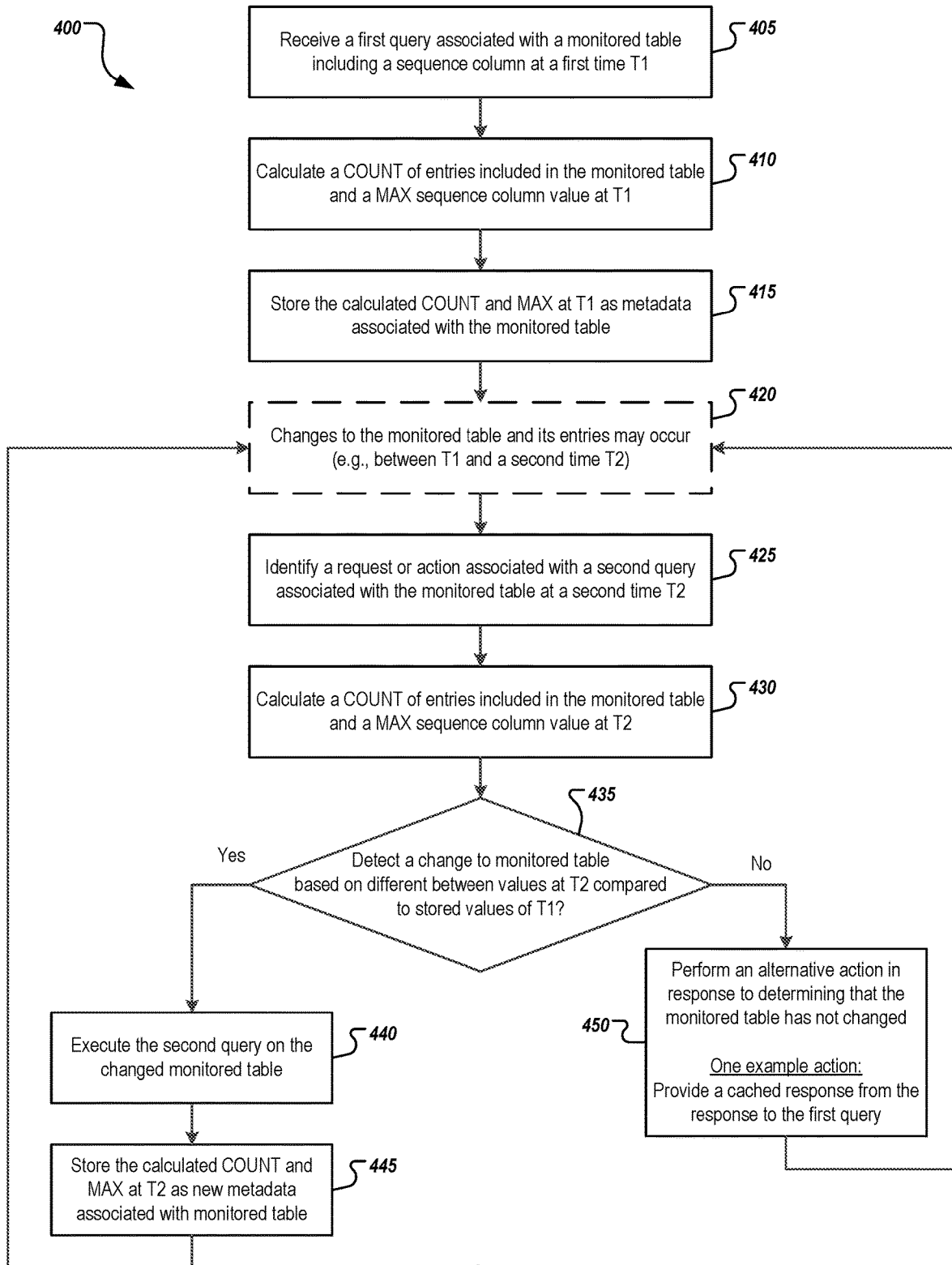
FIG. 4 represents an example flow for detecting changes to a monitored existing table based on a comparison between a stored set of table metadata and calculations associated with a current version of the table.

While the underlying table is updated by method 300, one or more determinations and change detection algorithms may be executed in response to various events and other triggers. FIG. 4 represents an example flow 400 for detecting changes to a monitored existing table based on a comparison between a stored set of table metadata and calculations associated with a current version of the table. FIG. 4 can be executed at any suitable time, including during or after the operations described in FIG. 3. In some instances, multiple table changes from FIG. 3 may occur between change detection methods performed by FIG. 4, while in other instances, no table changes described in FIG. 3 may occur between change detection actions. For clarity of presentation, the description that follows generally describes method 400 in the context of the system 100 illustrated in FIG. 1. However, it will be understood that method 400 may be performed, for example, by any other suitable system, environment, software, and hardware, or a combination of systems, environments, software, and hardware as appropriate.

At 405, a first query associated with a monitored table may be received at a first time, T1, where the monitored table includes a sequence column as described herein, and where each of its entries is associated with a unique sequence column value added according to the processes and solutions described herein. In some instances, box 405 may occur in response to the addition of the sequence column to the monitored table, or in response to a request from a user and/or application to generate a current state of the monitored table at T1.

At 410, a COUNT operation and a MAX operation can be used to calculate a number of entries included in the monitored table at T1, as well as the highest current sequence column value. Any suitable automated operations can be used to calculate the values, including operations internal to a DBMS associated with the monitored table, as well as one or more external applications or components that can access the data and calculate the results. At 415, the calculated COUNT and MAX values at T1 are stored as metadata associated with the monitored table, and can be used in response to later change detection attempts as a baseline to determine whether changes to the monitored table have occurred since T1.

At 420, which may be any length of time, one or more changes to the monitored table and its entries may occur, which can be handled in some instances by the operations of FIG. 3. In some instances, however, no changes to the data and underlying table may occur between T1 and a second time, T2, such that the COUNT and MAX associated with the monitored table do not change.

At 425, a request or action associated with a second query to the monitored table may be identified at a second time T2, where T2 occurs after T1, and where the second query is identical to the first query. In some instances, the request or action may not be associated with a second query, and may instead be a periodic- or event-based trigger associated with a change detection algorithm. In those instances, the request or action at 425 can cause the change detection operations of 425-435 to be triggered, and, where appropriate such as when a change is detected, the method 400 can cause a notification to be provided or transmitted to a particular component, application, or user, which can then trigger a further query or action upon the monitored table in response to the detected change. For example, a determination that a change has occurred may itself trigger the second query (identical to the first query) in alternative implementations.

Returning to the illustrated example, in response to identified request or action, the current version of the monitored table is analyzed at T2 to calculate a COUNT of the current entries and a determination of the current MAX sequence column value. Once calculated, method 400 continues at 435, where a determination of whether a change to the monitored table is detected based on a comparison of the stored COUNT and MAX values from T1 (and 415) to the values calculated at T2 (and 430). If the new COUNT and MAX at T2 are the same as the stored COUNT and MAX at T1, then a determination can be made that no changes have occurred. If, however, the new COUNT is larger than the stored COUNT, or the new MAX is larger than the stored MAX, a change to the monitored table can be considered detected. In response to a detected change, method 400 continues at 440, while in response to detecting no change in the underlying table at T2, method 400 continues at 450.

When a change is detected, method 400 continues at 440 as noted. At 440, based on the change, the second query associated with the identified request or action at 425 can be executed on the current version of the monitored table. In instances where the change determination is separate from a second query request, a notification of the detected change may be triggered at 440 instead, which may, in some instances, trigger an external component or an automated action to submit the identical second query to obtain the updated results. In addition to performing the suitable first action in response to detecting the change to the monitored table, at 445, the calculated COUNT and MAX at T2 is stored as the new metadata associated with the monitored table. Any future change detection operations can be based off of the new metadata from T2 (instead of the prior metadata from T1) until another change is received. Method 400 can then return to 420, where a time between T2 and a later time T3 can take place, where one or more changes to the monitored table may or may not occur.

Returning to 435, if no change is detected to the monitored table, method 400 continues at 450. At 450, at least one alternative action can be performed in response to determining that the monitored table has not changed based on the comparison. The at least one alternative action may include, for instance, providing a confirmation that no changes have occurred. If the change detection operations are triggered in response to a second query, then a cached response associated with a first query at T1 may be provided without the need to re-access the information within the monitored table. Alternatively, the notification of no change in response to the request or action of 425 may cause the associated component or application to access cached data without requiring the cached response to be sent. In some instances, an indication that no refreshing of previously obtained information may be sent. In still other instances, no action may need to be taken in response to the detection that no change has occurred, such as when the change detection determination is made separate from a particular query or access request. In those instances, actions may only be taken after changes have been detected at 435.

The detection of changes to a particular underlying monitored table such as described herein allows multiple advantages, which can be used to realize various solutions not previously available. For example, anonymization of personal and sensitive data sets may be required to meet particular privacy-related standards in one or more jurisdictions, and to provide security and privacy to users and persons to whom data stored in one or more monitored tables is related. Data used in various analytic solutions may be personal and sensitive in nature, but such data may be needed to provide meaningful analysis and results. The process of anonymizing data can take these sensitive and/or personal data sets as an input and return a non-sensitive and/or non-personal data set to an analytical system or application that can still allow for meaningful analytics, but without compromising the privacy of individuals or entities associated with that data.

In existing solutions, anonymization methods performing input anonymization take a data set and some anonymization parameters as an input and return a static anonymized representation of the data set to the user at a particular time. Any query to the anonymized data set will, however, only take the state of the original data set at the particular time into account, thereby only providing information on the static set of data returned after the anonymization operations.

In contrast to those existing solutions, the present disclosure enables real-time anonymization such that query results on an anonymized representation depend specifically on the current version of the original set of data, not a previously anonymized version of the data set in a state at a time the anonymization was previously applied. A brief overview of the proposed solution is provided. Initially, a user can specify or identify a particular set of parameters used for an anonymization method without executing the anonymization method. Any anonymized data set generated using the anonymization method is a representation of those requirements without any persisted data, that is, any generated anonymized data sets can be returned as a runtime artifact and may not be associated with a stored set of anonymized data, thereby reducing storage requirements in the system and providing dynamic sets of anonymized data available based on the current data set. The result of any anonymization method is considered an anonymized view of the underlying data.

In response to receiving or identifying a first query to be executed against a data set, an initial anonymization method is performed on the underlying data set to generate an anonymized data set result. The first query can then be executed against the anonymized data set result, as computed. Metadata can be stored and associated with the data set to be able to replay a certain anonymization transformation at a later time as the anonymized data set is not persisted, and can be used to ensure privacy guarantees. On subsequent queries to the anonymized view, the described system can perform a check to determine if the original, underlying data has changed. In some instances, the change detection algorithms described above may be used to determine if a change has occurred. If the underlying data has not changed, the anonymization is replayed based on the stored metadata associated with the prior anonymization. If the change detection determines that a change has occurred, however, the updated data is checked to determine whether the privacy guarantees associated with the current anonymization method can be maintained for the updated data set. If those privacy guarantees can be maintained, then the same anonymization method can be applied to the updated data set and the user or application associated with the query may receive access to the anonymized data. If, however, the privacy guarantees cannot be met as required, the anonymization request can be denied. In some instances, instead of denying the anonymization request, an alternative anonymization method can be identified (automatically or based on a user selection and application) that will satisfy the privacy requirements. In those instances, the new anonymization method applied can be saved as metadata for future use, the underlying data can be anonymized, and a result to the subsequent query can be generated against the new anonymized data set.

In the described solutions, the storage of the anonymization method metadata can be stored transactionally, and multiple executions against an anonymized data set can be run in parallel and not affect one another, either performance wise or from a correct anonymization point of view. For purposes of the description, the following terms may be used. An original data set may be a data set (e.g., an underlying data set) containing sensitive information of individuals or entities. An anonymized data set may be an anonymized version of an original data set that does not contain personal and sensitive information of individuals or entities following the application of a particular anonymization method and a transformation from the original data set. An anonymization method can be a particular transformation operation applied to an original data set resulting in an anonymized data set.

In some instances, the change detection algorithms described previously may be used to determine whether the original data set associated with the anonymization techniques has been modified. In other instances, however, other change detection techniques may be applied which can alternatively determine whether the original data set has been modified.

A difficulty with anonymization operations is that even after various anonymization operations have been performed, such as a removal of a person's name, unique identifier (e.g., a social security number or patient ID, etc.), or other specifically-identifying information, the person or persons may still be identifiable based on additional information outside of the data set. For example, where the underlying data relates to health or sickness information, context associated with the information may, in some instances, be used to reverse engineer a determination of the person. For instance, consider a set of patient information where one person lives in a certain town, and may have very specific health-related information in the data set, such as their particular height. Even where all other information but height, hometown, and sickness is removed, those three points of data may be used to triangulate or otherwise identify the patient based on a person's knowledge of the area, or external knowledge (e.g., from Facebook or other directories or information sources). Therefore, to perform proper anonymizations of data, the state of the current underlying table or data must be considered in light of the anonymization operations being applied to determine whether a particular set of privacy guarantees and/or requirements are being met. In some instances, the analysis of a particular anonymization technique may be based on one or more parameters, such as those describing how data should be grouped and/or manipulated to provide relative security surpassing any legal or intended requirements. Therefore, the current data set can be considered individually or in combination with one or more particular anonymization methods to determine whether an anonymized data set from the monitored table can be sufficiently anonymized (e.g., based on the anonymization requirements or security guarantee). In some instances, the parameters associated with a particular anonymization method may define the operations to be performed on the underlying data (e.g., particular segmentations of particular groups of entries, specific anonymization actions such as removal or obfuscation of personally identifiable information (PII), etc.), as well as the required privacy guarantees and limitations on the anonymized data set that must be met after application of the anonymization method. In some instances, privacy guarantees may be associated with an entire monitored table or original data set, such that all anonymization operations applied to the data must be capable of meeting or exceeding those privacy guarantees.

Figure 5:
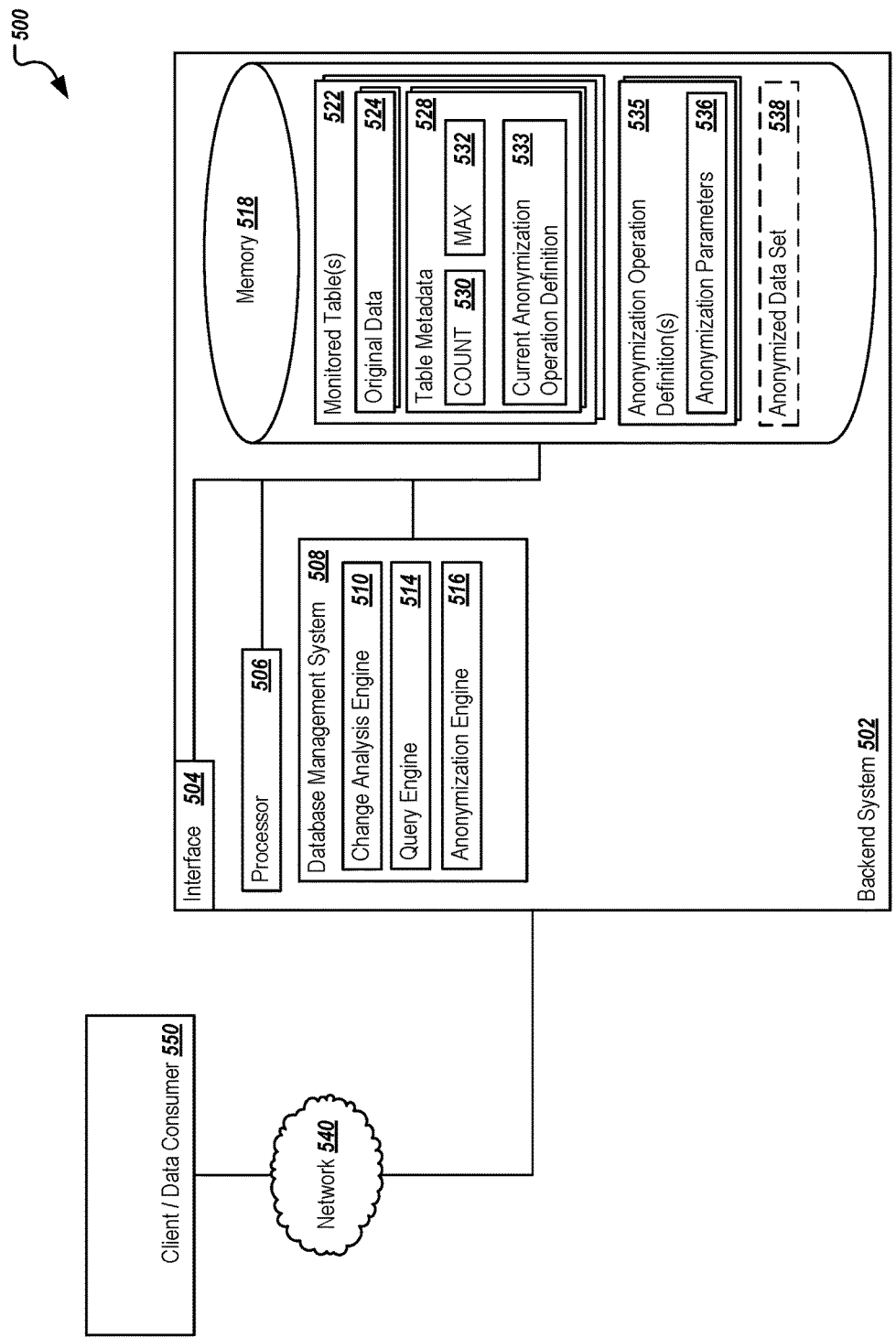
FIG. 5 is a block diagram illustrating an example system for applying real-time anonymizations to original data sets for responding to queries from one or more consuming applications.

FIG. 5 is a block diagram illustrating an example system for applying real-time anonymizations to original data sets for responding to queries from one or more consuming applications. As illustrated in FIG. 5, system 500 is associated with a system for applying various anonymization operations to original data sets including sensitive or personal information in real-time and in response to incoming queries. The illustrated system 500 represents a simplified version of system 100 including several additional anonymization-specific components. Other implementations of system 500 can be implemented using separate or alternative components instead.

As illustrated, system 500 includes a backend system 502 and one or more clients or other data consumers 550 (referred to as client 550) communicably connected via network 540. The client and/or data consumer 550 may be any computer or system attempting to access the anonymized data set 538 as transformed from the original data set 524 using one or more anonymization operations 535 or methods as defined within the system 500. The components described in FIG. 5 may be similar to or different from the similar components described in FIG. 1. For example, the interface 504, processor 506, and memory 518 may be similar to or different from interface 104, processor 106, and memory 118 of FIG. 1. The DBMS 508 may be generally similar to the DBMS 108 of FIG. 1, and is shown in a simplified manner for purposes of the discussion related to FIG. 5.

As shown, the DBMS 508 includes a change analysis engine 510 (which may be similar to or different from the change analysis engine 110 in DBMS 108), a query engine 514, and a new element, the anonymization engine 516. The anonymization engine 516 can be used to perform the one or more appropriate anonymization operations as defined within an anonymization operation definition 535 as well as to analyze whether a current anonymization operation 533 can sufficiently anonymize a particular original data set 524 within the parameters 536 defined for or associated with the current anonymization operations. In some instances, the anonymization engine 516 may be able to automatically identify a new anonymization operation definition 535 to be applied to a particular original data set 524 after a determination is made that a current anonymization operation definition 533 is insufficient to meet the privacy requirements defined in or associated with, for instance, the anonymization parameters 536 associated with each anonymization operation definition 535. In some instances, different tables 522, original data sets 524, and/or particular backend systems 502 may be associated with a set of privacy requirements that are used for any anonymization operations applied to the data 524. In other words, a global set of privacy requirements may be defined such that any anonymization technique or operation 535 must meet a certain privacy threshold as defined by one or more anonymization rules. The anonymization engine 516 can consider the various anonymization operations 535 and their expected output and parameters 536 to determine whether those operations can meet or exceed the privacy requirements. If not, the anonymization may be denied, or alternatively, a new anonymization operation 535 can be identified and applied. In some instances, in response to determining that a current anonymization operation definition 533 is not suitable to anonymize the original data set 524 to an appropriate level, the anonymization engine 516 may generate and/or transmit a request to a user or application to identify a suitable replacement anonymization operation 535 to apply going forward based on the current original data set 524.

In some instances, an initial anonymization operation definition 535 may be manually or automatically associated with a particular monitored table 522 and/or an original data set 524. The initial anonymization operation definition 535 can be stored in a set of table metadata 528, such that the anonymization engine 516 can identify and apply those anonymization operations as queries are received. When a first query is received via the query engine 514, the original data set 524 can be transformed, at runtime, into the anonymized data set 538, upon which the received first query can be safely executed without obtaining or viewing personal or sensitive data, while still providing meaningful and/or responsive data. The anonymized data set 538 may be generated at runtime and may not be persisted in many implementations, such that the original data set 524 and the transformed anonymized data set 538 need not be duplicatively stored. By storing in the table metadata 528 the details of the particular current anonymization operation 533 being used, the anonymization can be duplicated in the future without requiring a doubling of the footprint of the original data set 524.

When a second query is received by the query engine 514, the change analysis engine 510 can be used to determine whether any changes to the underlying original data set 524 have occurred since any prior queries have been received and the anonymization operations applied. In some instances, a change detection process similar to that previously described can be used to compare a count of the number of entries and a maximum sequence column value in the monitored table 522 and the current original data set 524 to a stored COUNT 530 and MAX 532 from a prior interaction. In other instances, other suitable change detection operations and actions may be performed to determine whether the monitored table 522 has been modified.

When the monitored table 522 (and the original data set 524) have not been associated with a detected change, the anonymization engine 516 can identify the current anonymization operation definition 533 associated with the table and included in the table metadata 528, and cause a real-time anonymization of the original data set 524 to be performed. The query engine 514 can then execute the second query against the anonymized data set 538 generated at runtime. If the monitored table 522 and/or the original data set 524 have been modified, then the anonymization engine 516 can perform an analysis of the updated original data set 524 and the current anonymization operation definition 533 to determine whether the anonymization methods associated with the current definition 533 can satisfy and/or exceed the privacy guarantees when applied to the new data set 524. If yes, then the anonymization is performed using the current anonymization operation definition 533, a new anonymized data set 538 is generated, and the second query is executed. If not, the anonymization request is denied until a new anonymization operation definition 535 is identified and associated with the table metadata 528.

The client 550 can interact with the DBMS 508 and the monitored tables 522 via network 540 as described in FIG. 1. The client 550 may be any suitable computer or system associated with a user or application authorized to interact with the anonymized data sets 538 corresponding to the original data sets 524.

Figure 6A:
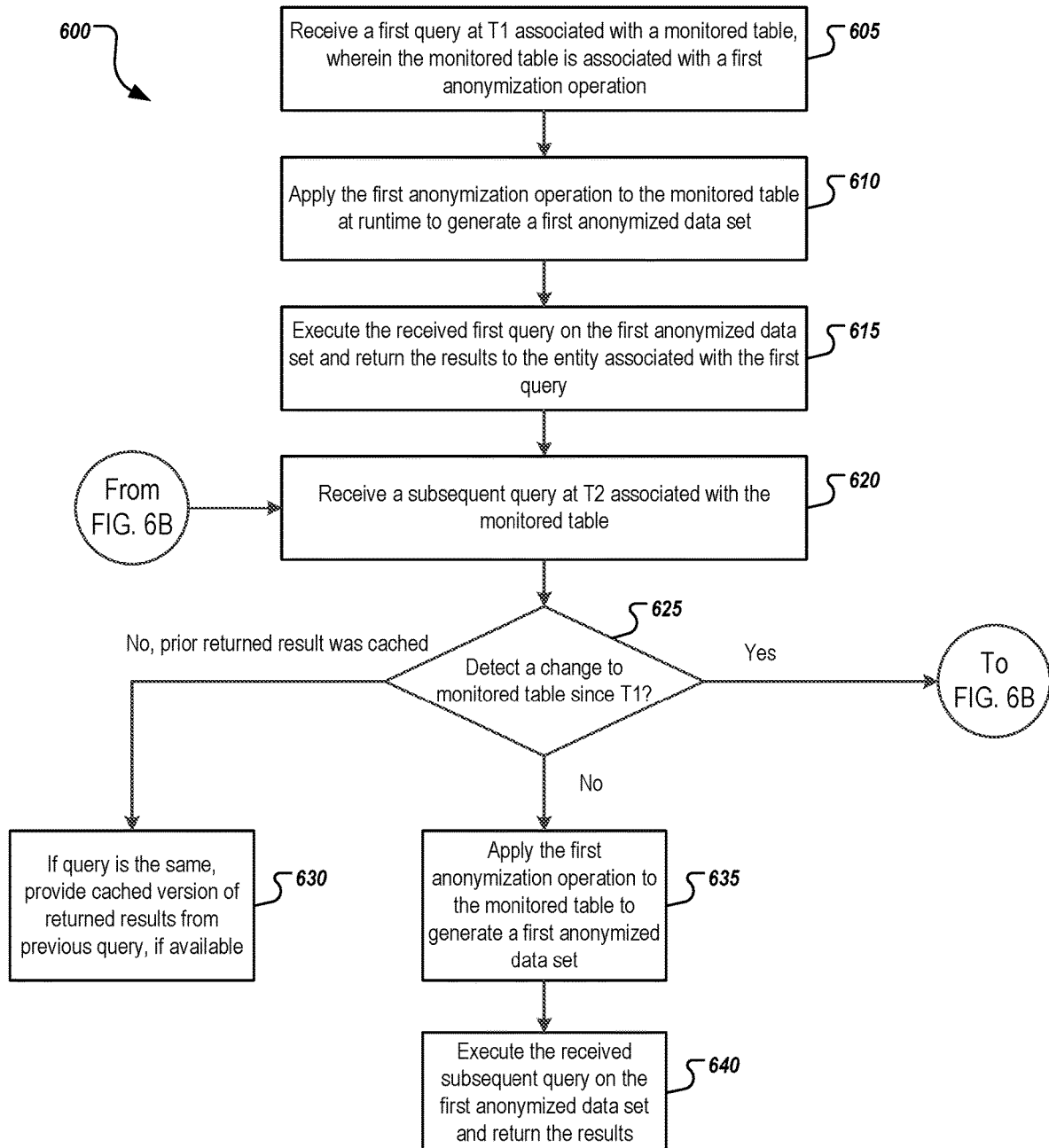
FIGS. 6A-B represent an example flow for applying real-time anonymizations to original data sets for responding to queries from one or more consuming applications.
Figure 6B:
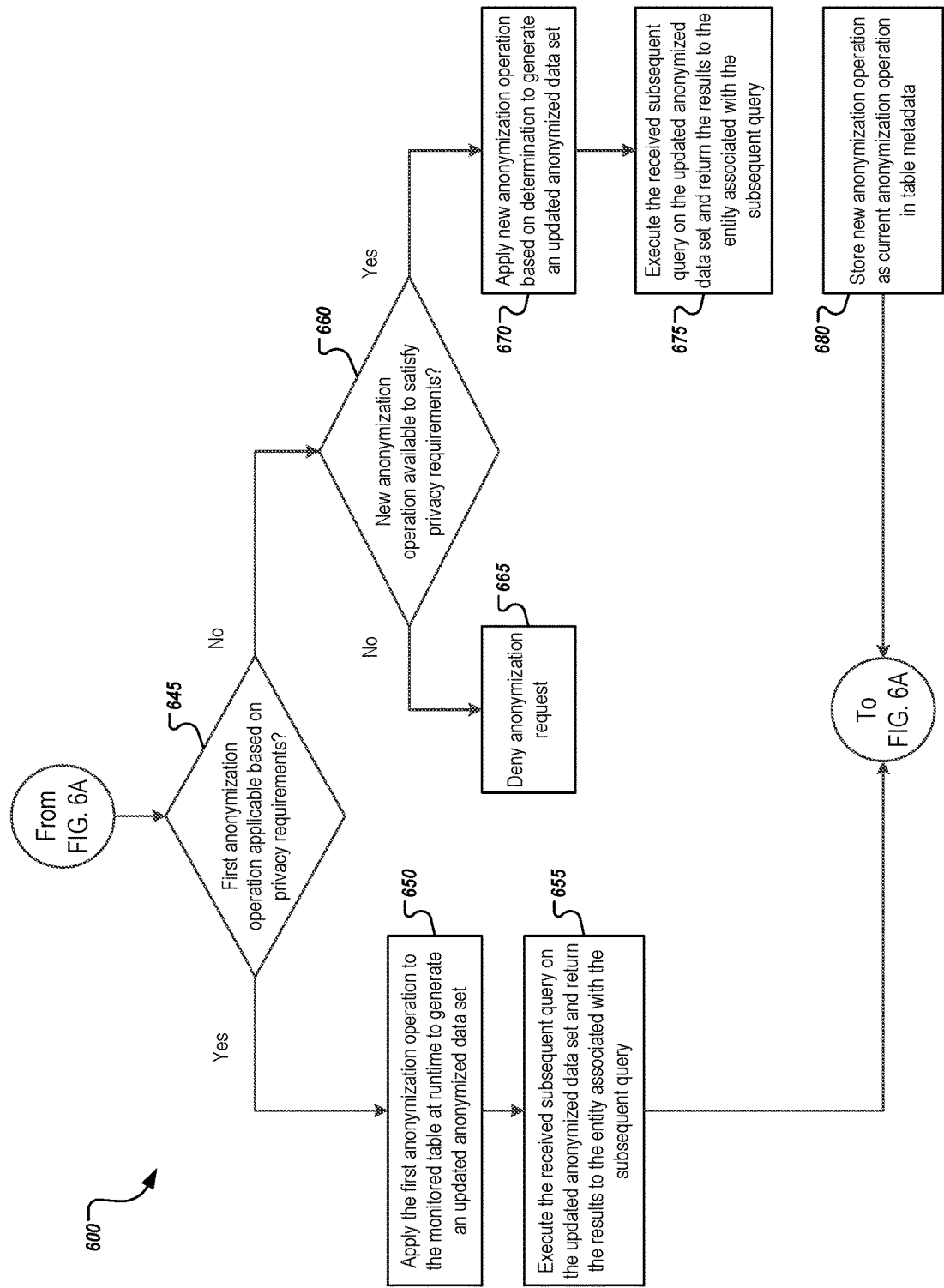

FIGS. 6A-B represent an example flow 600 for applying real-time anonymizations to original data sets for responding to queries from one or more consuming applications. For clarity of presentation, the description that follows generally describes method 600 in the context of the system 500 illustrated in FIG. 5. However, it will be understood that method 500 may be performed, for example, by any other suitable system, environment, software, and hardware, or a combination of systems, environments, software, and hardware as appropriate.

At 605, a first query directed to a monitored table is received at a first time T1, where the monitored table includes an original data set and is associated with a first anonymization operation. The first anonymization operation may be a single anonymization operation or a combination of anonymization operations, and can be assigned by a user or application to ensure that a set of privacy guarantees are maintained with respect to the original data set. The set of privacy guarantees may be any rules or requirements for how data is to be anonymized, and may be separate from a particular anonymization operation(s). The first anonymization operation may be initially determined, when applied to the original data set, to generate an anonymized data set that can satisfy the set of privacy guarantees required by the system. In some instances, the first anonymization operation may be stored in a set of table metadata, and can be accessed at runtime to identify and apply the particular anonymization operations according to a set of predefined parameters associated with the first anonymization operation.

At 610, the first anonymization operation can be applied to the original data set of the monitored table at runtime to generate a first anonymized data set. In some instances, the first anonymized data set may be a runtime object, and may not be persisted in memory or other storage. In doing so, the system described herein can avoid unnecessary and duplicative storing of the original data set, thereby halving the amount of storage required to enable anonymized query responses. In some instances, the first anonymized data set may be temporarily stored for a period of time while queries are executed again the data, but may not be maintained in long-term storage in those instances.

At 615, the received first query can be executed on the first anonymized data set and the results of the query execution can be returned to the entity or application associated with the first query. Because the first anonymized data set is known to satisfy the privacy requirements of the system or data source, queries executed against the first anonymized data set may be considered safe while allowing for further analytics to be performed on the data. In some instances, the responsive data set may be cached such that, where no data in the original data set has changed and the same query is received, the responsive data set can be used without requiring a new query execution.

At 620, a subsequent query associated with the monitored table and the original data set may be received at time T2. In some instances, changes may have been applied to the original data set. Any suitable change detection algorithm or operations may be used at 625 to detect a change to the original data set and/or the monitored tables. In some instances, change detection operations similar to those described in FIGS. 1-4 may be performed, where a count of entries and a maximum sequence column value from a prior time (e.g., generated, in some instances, in response to the first or previous queries) may be compared to similar calculations of the data or table at the current time. In other instances, alternative change detection algorithms can be performed, such as reviewing a change log or analyzing a last update of the original data set.

If no changes are detected to the monitored table and the original data set, then method 600 may continue at either 630 or 635. Method 600 may continue at 630 where the subsequent query is the same as the first query, and where the prior result returned in response to the first query was cached. In such instances, at 630 the cached version of previous query's results can be returned, where available, where the results are obtained from the content of the prior anonymized data set. In such instances, the anonymized data set obtained at 610 does not need to be persisted, as only the responsive result set is provided without needing to use the first anonymized data set. If, instead, the subsequent query is different than the first query, or the previous query's results were not cached, method 600 continues at 635, where the first anonymization operation is identified from the stored metadata and applied to regenerate the first anonymized data set, which should be identical to the anonymized data set generated at 610. The received subsequent query can then be executed against the first anonymized data set, and the results can be returned to the entity or application associated with the subsequent query.

If, however, a change is detected to the monitored table and the underlying original data set at 625, then method 600 continues at 645. At 645, a determination is made as to whether the first anonymization operation previously used in association with the original data set is applicable based on the privacy requirements and the updated data set. In some instances, the actions taken by the first anonymization operation may not be able to sufficiently anonymize the updated data set to meet certain anonymization and privacy thresholds, such as when the removal of data or the addition of new data causes one or more personal or sensitive data sets to remain in the anonymized data set when the first anonymization operation is performed. In other instances, the changes to the data may not change the applicability of the first anonymization operation, such that the first anonymization operation can be reused without violating the privacy requirements. If the first anonymization operation is determined to remain applicable and/or satisfactory, method 600 continues at 650.

At 650, the first anonymization operation can be applied to the updated original data set and the monitored table at runtime to generate an updated anonymized data set. The received subsequent query can be then be executed against the updated anonymized data set at 655, where the results of the subsequent query are returned after execution. Method 600 may end, or return to 620, where another query can be received, and a similar set of operations can be performed.

Returning to 645, if the first anonymization operation is determined to fail to maintain the privacy requirements, then method 600 can continue at 660. At 660, a determination can be made as to whether a new anonymization operation is available to be applied to the updated original data set in order to satisfy or exceed the privacy requirements. In some instances, an automatic process may be performed to determine if one of a plurality of available anonymization operations can be applied to the updated data set to reach or exceed the privacy requirements. In other instances, user input or the determination of an external application as to a particular anonymization operation to be used may be requested via a generated and transmitted message or request. If a new anonymization operation cannot be identified, method 600 continues at 665, where the anonymization request is denied. An indication of the denial can be provided to the requesting system, as appropriate.

Alternatively, if a new anonymization operation can be identified as available to satisfy the privacy requirements, method 600 continues at 670 where the newly identified anonymization operation is applied to generate an updated anonymized data set. At 675, the subsequent query is then executed against the updated anonymized data set with the results being returned to the entity or application associated with the subsequent query. At 680, the new anonymization operation is stored as the current anonymization operation in the table metadata. By storing the new anonymization operation and not the updated anonymized data set, future on the fly anonymizations can be performed using the new anonymization operation without using system resources to store and maintain a persisted anonymized data set. Method 600 may then return to 620, where another query can be received and a similar set of operations can be performed.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
    receiving, at a first time T1, a first query associated with a monitored table, wherein the monitored table is associated with a first anonymization operation, wherein the first anonymization operation satisfies a defined privacy requirement;
    applying the first anonymization operation to the monitored table at runtime to generate a first anonymized data set;
    executing the first query on the first anonymized data set and returning a first result set in response to the executed first query;
    receiving, at a second time T2, wherein T2 occurs after T1, a subsequent query associated with the monitored table;
    determining whether a change to the monitored table has occurred since T1;
    in response to detecting a change to the monitored table, wherein the changed monitored table comprises an updated monitored table, determining whether the first anonymization operation satisfies the defined privacy requirement when applied to the changed monitored table;
    in response to determining that the first anonymization operation does not satisfy the defined privacy requirement when applied to the updated monitored table, determining a second anonymization operation capable of satisfying the defined privacy requirement when applied to the updated monitored table;
    in response to determining the second anonymization operation, applying the second anonymization operation to the updated monitored table at runtime to generate a second anonymized data set, wherein the second anonymization operation is associated with the updated monitored table; and executing the subsequent query on the second anonymized data set and returning a second result set in response to the executed subsequent query.

2. The method of claim 1, wherein the first anonymization operation is stored in metadata associated with the monitored table prior to T1, and, in response to determining the second anonymization operation, the second anonymization operation replaces the first anonymization operation stored in the metadata associated with the monitored table.

3. The method of claim 1, wherein the second anonymization operation is determined automatically without user input in response to determining that the first anonymization operation does not satisfy the defined privacy requirement.

4. The method of claim 1, wherein, in response to determining that the first anonymization operation satisfies the defined privacy requirement when applied to the updated monitored table, the method comprises:

applying the first anonymization operation to the updated monitored table at runtime to generate a third anonymized data set; and executing the subsequent query on the third anonymized data set and returning a third result set in response to the executed subsequent query.

5. The method of claim 1, wherein in response to determining that the first anonymization operation does not satisfy the defined privacy requirement when applied to the updated monitored table, no anonymization operations are identified as capable of satisfying the defined privacy requirements, and wherein the method comprises:

denying execution of the subsequent query.

6. The method of claim 1 further comprising, in response to detecting that the monitored table is unchanged:

applying the first anonymization to the monitored table to regenerate the first anonymized data set; and executing the subsequent query on the regenerated first anonymized data set and returning a fourth result set identical to the first result set in response to the executed subsequent query.

7. The method of claim 1, wherein the anonymized data sets are not persisted to memory.

8. The method of claim 1, further comprising:

receiving, at a third time T3, wherein T3 occurs after T2, a second subsequent query associated with the updated monitored table;

determining whether a change to the updated monitored table has occurred since T2;

in response to detecting a change to the updated monitored table, wherein the changed monitored table comprises a second updated monitored table, determining whether the second anonymization operation satisfies the defined privacy requirement when applied to the second updated monitored table;

in response to determining that the second anonymization operation does not satisfy the defined privacy requirement when applied to the second updated monitored table, determining a third anonymization operation capable of satisfying the defined privacy requirement when applied to the second updated monitored table;

in response to determining the third anonymization operation, applying the third anonymization operation to the updated monitored table at runtime to generate a third anonymized data set, wherein the third anonymization operation is associated with the updated monitored table; and executing the second subsequent query on the third anonymized data set and returning a third result set in response to the executed second subsequent query.

9. The method of claim 1, wherein each entry in the monitored table is associated with a sequence column, each sequence column value comprising a unique positive integer, wherein the sequence column value for new entries in the table is automatically incremented by one from a last highest sequence column value, and wherein determining whether a change to the monitored table has occurred since T1 comprises:

calculating a total count of a number of entries included in the monitored table and a maximum sequence column value from each of the entries at T2;

comparing a previously calculated total count of the number of entries and the maximum sequence column value at T1 associated with the monitored table to the calculated total count of the number of entries and the maximum sequence column value at T2 to determine whether the values are the same;

determining that the monitored table has not changed based on a determination that the values are the same; and determining that the monitored table has changed to the updated monitored table based on a determination that the values are different, and associating the calculated total count of the number of entries and the maximum sequence column value at T2 with the updated monitored table.

10. A system comprising:

at least one processor; and a memory communicatively coupled to the at least one processor, the memory storing instructions which, when executed, cause the at least one processor to perform operations comprising:

receiving, at a first time T1, a first query associated with a monitored table, wherein the monitored table is associated with a first anonymization operation, wherein the first anonymization operation satisfies a defined privacy requirement;

applying the first anonymization operation to the monitored table at runtime to generate a first anonymized data set;

executing the first query on the first anonymized data set and returning a first result set in response to the executed first query;

receiving, at a second time T2, wherein T2 occurs after T1, a subsequent query associated with the monitored table;

determining whether a change to the monitored table has occurred since T1;

in response to detecting a change to the monitored table, wherein the changed monitored table comprises an updated monitored table, determining whether the first anonymization operation satisfies the defined privacy requirement when applied to the changed monitored table;

in response to determining that the first anonymization operation does not satisfy the defined privacy requirement when applied to the updated monitored table, determining a second anonymization operation capable of satisfying the defined privacy requirement when applied to the updated monitored table;

in response to determining the second anonymization operation, applying the second anonymization operation to the updated monitored table at runtime to generate a second anonymized data set, wherein the second anonymization operation is associated with the updated monitored table; and executing the subsequent query on the second anonymized data set and returning a second result set in response to the executed subsequent query.

11. The system of claim 10, wherein the first anonymization operation is stored in metadata associated with the monitored table prior to T1, and, in response to determining the second anonymization operation, the second anonymization operation replaces the first anonymization operation stored in the metadata associated with the monitored table.

12. The system of claim 10, wherein the second anonymization operation is determined automatically without user input in response to determining that the first anonymization operation does not satisfy the defined privacy requirement.

13. The system of claim 10, wherein, in response to determining that the first anonymization operation satisfies the defined privacy requirement when applied to the updated monitored table, wherein the instructions instruct the at least one processor to perform operations comprising:

applying the first anonymization operation to the updated monitored table at runtime to generate a third anonymized data set; and executing the subsequent query on the third anonymized data set and returning a third result set in response to the executed subsequent query.

14. The system of claim 10, wherein in response to determining that the first anonymization operation does not satisfy the defined privacy requirement when applied to the updated monitored table, no anonymization operations are identified as capable of satisfying the defined privacy requirements, and wherein the instructions instruct the at least one processor to perform operations comprising denying execution of the subsequent query.

15. The system of claim 10, wherein the instructions instruct the at least one processor to perform operations comprising, in response to detecting that the monitored table is unchanged:

applying the first anonymization to the monitored table to regenerate the first anonymized data set; and executing the subsequent query on the regenerated first anonymized data set and returning a fourth result set identical to the first result set in response to the executed subsequent query.

16. The system of claim 10, wherein the anonymized data sets are not persisted to memory.

17. A non-transitory computer-readable medium storing instructions which, when executed, cause at least one processor to perform operations comprising:

receiving, at a first time T1, a first query associated with a monitored table, wherein the monitored table is associated with a first anonymization operation, wherein the first anonymization operation satisfies a defined privacy requirement;

applying the first anonymization operation to the monitored table at runtime to generate a first anonymized data set;

executing the first query on the first anonymized data set and returning a first result set in response to the executed first query;

receiving, at a second time T2, wherein T2 occurs after T1, a subsequent query associated with the monitored table;

determining whether a change to the monitored table has occurred since T1;

in response to detecting a change to the monitored table, wherein the changed monitored table comprises an updated monitored table, determining whether the first anonymization operation satisfies the defined privacy requirement when applied to the changed monitored table;

in response to determining that the first anonymization operation does not satisfy the defined privacy requirement when applied to the updated monitored table, determining a second anonymization operation capable of satisfying the defined privacy requirement when applied to the updated monitored table;

in response to determining the second anonymization operation, applying the second anonymization operation to the updated monitored table at runtime to generate a second anonymized data set, wherein the second anonymization operation is associated with the updated monitored table; and executing the subsequent query on the second anonymized data set and returning a second result set in response to the executed subsequent query.

18. The computer-readable medium of claim 17, wherein the first anonymization operation is stored in metadata associated with the monitored table prior to T1, and, in response to determining the second anonymization operation, the second anonymization operation replaces the first anonymization operation stored in the metadata associated with the monitored table.

19. The computer-readable medium of claim 17, wherein the second anonymization operation is determined automatically without user input in response to determining that the first anonymization operation does not satisfy the defined privacy requirement.

20. The computer-readable medium of claim 17, wherein, in response to determining that the first anonymization operation satisfies the defined privacy requirement when applied to the updated monitored table, the method comprises:

applying the first anonymization operation to the updated monitored table at runtime to generate a third anonymized data set; and executing the subsequent query on the third anonymized data set and returning a third result set in response to the executed subsequent query.

* * * * *